(12) United States Patent
Wang et al.

(10) Patent No.: US 8,311,216 B2
(45) Date of Patent: Nov. 13, 2012

(54) PACKET CIPHER ALGORITHM BASED ENCRYPTION PROCESSING DEVICE

(75) Inventors: Wei Wang, Xi'an (CN); Jun Cao, Xi'an (CN); Xiang Yan, Xi'an (CN)

(73) Assignee: China IWNCOMM Co., Ltd., Xi'an (CN)

( * ) Notice: Subject to any disclaimer, the term of this patent is extended or adjusted under 35 U.S.C. 154(b) by 357 days.

(21) Appl. No.: 12/743,491

(22) PCT Filed: Nov. 13, 2008

(86) PCT No.: PCT/CN2008/073041
§ 371 (c)(1),
(2), (4) Date: May 18, 2010

(87) PCT Pub. No.: WO2009/067929
PCT Pub. Date: Jun. 4, 2009

(65) Prior Publication Data
US 2010/0284534 A1  Nov. 11, 2010

(30) Foreign Application Priority Data
Nov. 19, 2007  (CN) .......................... 2007 1 0019110

(51) Int. Cl.
H04K 1/00 (2006.01)
H04K 1/06 (2006.01)
H04L 9/00 (2006.01)
H04L 9/08 (2006.01)

(52) U.S. Cl. .............. 380/37; 380/28; 380/42; 380/259; 380/268; 380/279

(58) Field of Classification Search ..................... 380/28, 380/37, 42, 259, 268, 277
See application file for complete search history.

(56) References Cited

U.S. PATENT DOCUMENTS
6,243,470 B1  6/2001  Coppersmith et al.
(Continued)

FOREIGN PATENT DOCUMENTS
CN  1734527 A  2/2006
(Continued)

OTHER PUBLICATIONS

Analysis and Implementation of SMS4 Algorithm; A dissertation Submitted to The Academic Degree Evaluation Committee; Zhejiang University; by: Zhao Xuxin; May 2006. Abstract supplied by Unitalen Attorneys at Law.

(Continued)

*Primary Examiner* — Mohammad W Reza
(74) *Attorney, Agent, or Firm* — Harness, Dickey & Pierce, P.L.C.

(57) ABSTRACT

A packet cipher algorithm based encryption processing device includes a key expand unit and an encryption unit. The key expand unit comprises a key expand unit data registration component and at least one key expand unit data conversion component. The encryption unit comprises an encryption unit data registration component and at least one encryption unit data conversion component, and the number of the encryption unit data conversion component is the same as that of the key expand unit data conversion component, and besides, they are one to one. A sub-key output of each key expand unit data conversion component connects the corresponding sub-key input of each encryption unit data conversion component to solve the technical problems that the encryption efficiency of the prior packet cipher algorithm based encryption processing device is low and the cost is high. The advantage of the present invention is reducing the resource consumption and further reducing the achievement cost of the device under the premise of keeping the high efficiency of the prior art.

9 Claims, 3 Drawing Sheets

U.S. PATENT DOCUMENTS

| | | |
|---|---|---|
| 7,123,720 B2 | 10/2006 | Lim |
| 2002/0131588 A1 | 9/2002 | Yang |
| 2002/0159599 A1 | 10/2002 | Matsui et al. |
| 2004/0252831 A1 | 12/2004 | Uehara |
| 2006/0045265 A1 | 3/2006 | Matsui et al. |

FOREIGN PATENT DOCUMENTS

| | | | |
|---|---|---|---|
| CN | 1845213 | A | 10/2006 |
| CN | 101013938 | A | 8/2007 |
| CN | 101044535 | A | 9/2007 |
| CN | 101159544 | A | 4/2008 |
| CN | 101159545 | A | 4/2008 |
| EP | 1202488 | A2 | 5/2002 |
| RU | 2206182 | C2 | 6/2003 |
| RU | 2206961 | C2 | 6/2003 |
| WO | WO-9914889 | A1 | 3/1999 |
| WO | WO-02098052 | A2 | 12/2002 |
| WO | WO-03096610 | A1 | 11/2003 |
| WO | WO-2007075154 | A2 | 7/2007 |

OTHER PUBLICATIONS

Extended European Search Report regarding Application No. 08855567.7-1525/2216934, dated Jan. 11, 2012.

Panu Hamalainen et al. "Configurable Hardware Implementation of Triple-DES Encryption Algorithm For Wireless Local Area Network." Digital and Computer Systems Laboratory, Tampere University of Technology. Tampere, Finland. 2001.

Kazumaro Aoki et al. "*Camellia*: A 128-Bit Block Cipher Suitable for Multiple Platforms." Nippon Telegraph and Telephone Corporation, Kanagawa, Japan. Mitsubishi Electric Corporation, Kanagawa, Japan. 2000-2001.

Russian Decision on Grant regarding Application No. 2010124849, dated Nov. 29, 2011. Translation provided by Unitalen Attorneys at Law.

PACKET CIPHER ALGORITHM BASED ENCRYPTION PROCESSING DEVICE

This application claims priority to Chinese Patent Application No. 200710019110.2, filed with the Chinese Patent Office on Nov. 19, 2007 and entitled "Block cipher algorithm based Encryption processing device", which is hereby incorporated by reference in its entirety.

FIELD OF THE INVENTION

The present invention relates to the field of information security and in particular to an encryption processing method based upon a block cipher algorithm.

BACKGROUND OF THE INVENTION

Block cipher algorithms generally include a Data Encryption Standard (DES) algorithm, a tri-DES (3DES) algorithm, an Advanced Encryption Standard (AES) algorithm, an International Data Encryption Algorithm (IDEA), an SMS4 algorithm published by the State Secret Code Regulatory Commission Office, etc. Key components implementing a block cipher algorithm include a key expansion unit, an encryption unit and a sub-key array storage unit. Particularly, internal structures of the key expansion unit and the encryption unit are similar in that they generally consist of a data register component and a data conversion component.

The data register component is generally implemented with a general flip flop to register data. Data registered in this component is invariant in a clock cycle. The general flip flop is a data register device in which data at a data input is transmitted to an output of the flip flop at a rising or falling edge of a clock and the data at the output of the flip flop is invariant at other instances of time.

The data conversion component is a component to process data as required in the block cipher algorithm, e.g., a component to process data as required in the national SMS4 cipher algorithm. Operations performed by the data conversion component include only one integration and permutation as specified in the cipher algorithm.

The sub-key array storage unit is adapted to store an array of sub-keys. An array of sub-keys in the existing technology is typically an array of data already prepared prior to encryption and decryption and generated by the key expansion unit. In the SMS4 cipher algorithm, data of the sub-key array storage unit is arranged in a descending/ascending order of addresses and can be named rk0, rk1, rk31.

A current process of encrypting and decrypting data as required in the SMS4 cipher algorithm includes two separate phases of expanding a key and encrypting data. As illustrated in FIG. 1, firstly a key expansion unit expands a key into an array of sub-keys and stores them sequentially into a sub-key array storage unit, and then an encryption unit encrypts data using the array of sub-keys into which the key is expanded.

A. The phase of expanding a key:

1) An external key is input to a data register component of a key expansion unit.

An external key subject to preliminary processing is input to a data register component 100 of a key expansion unit for registering.

2) Conversion of data.

The data registered in the data register component 100 of the key expansion unit is input to a data conversion component 101 of the key expansion unit for conversion to result in sub-keys.

3) Iterative Processing of the Data.

Data resulting from previous conversion is stored in the data register component 100 of the key expansion unit while the resulting sub-keys are stored in a first line of a sub-key array storage unit 2, and then the data registered in the data register component 100 of the key expansion unit is input again to the data conversion component 101 of the key expansion unit for conversion and resulting sub-keys are stored in a next line of the sub-key array storage unit 2. This process of converting the data is repeated for thirty-two times to result in an array of sub-keys of 32×32 bits=1024 bits.

B. The Phase of Encrypting the Data:

1) External data is input to a data register component of an encryption unit.

External data is input to a data register component 300 of an encryption unit for registering.

2) Conversion of the Data.

The data registered in the data register component 300 of the encryption unit is input to a data conversion component 301 of the encryption unit, and the data corresponding to the first line of the array of sub-keys stored in the sub-key array storage unit 2 is input to the data conversion component 301 of the encryption unit for conversion.

3) Iterative Processing of the Data.

Data resulting from previous conversion is stored in the data register component 300 of the encryption unit, and then the data registered in the data register component 300 of the encryption unit is input again to the data conversion component 301 of the encryption unit for conversion and also the next line of sub-keys of the sub-key array storage unit 2 are input to the data conversion component 301 of the encryption unit for conversion of the data. This process is repeated for thirty-two times to result in data.

It takes thirty-two clock cycles in the foregoing encryption algorithm to process a set of data with low efficiency. In order to improve this circumstance, the processing efficiency can be improved with an increased number of data conversion components. For example, a set of 128-bit data can be processed in sixteen clock cycles as illustrated in FIG. 2.

A sub-key array storage component is an indispensable component in the existing technology. If a 1024-bit sub-key array storage component is implemented with a register in an integrated circuit, then a logic resource of approximately ten thousands gates, which occupies approximately 40% of a total resource (a total resource of approximately twenty-five thousands gates is consumed in the solution of FIG. 1) will be consumed at a high cost.

SUMMARY OF THE INVENTION

An object of the invention is to provide an inexpensive and efficient encryption processing method based upon a block cipher algorithm so as to address the technical problem of a high cost of the encryption processing method based upon a block cipher algorithm in the existing technology.

A technical solution of the invention is as follows.

An encryption processing device based upon a block cipher algorithm includes a key expansion unit and an encryption unit, wherein:

the key expansion unit includes a data register component of the key expansion unit and at least one data conversion component of the key expansion unit, the encryption unit includes a data register component of the encryption unit and at least one data conversion component of the encryption unit, the number of data conversion components of the encryption unit is identical to the number of data conversion components of the key expansion unit, and the data conversion components of the encryption unit are in one-to-one connection with the data conversion components of the key expansion unit;

an output of the data register component of the key expansion unit is connected with an input of the first one of the data conversion components of the key expansion unit, every two adjacent ones of the data conversion components of the key expansion unit are connected sequentially, and an output of the last one of the data conversion components of the key expansion unit is connected with an input of the data register component of the key expansion unit;

an output of the data register component of the encryption unit is connected with an input of the first one of the data conversion components of the encryption unit, every two adjacent ones of the data conversion components of the encryption unit are connected sequentially, and an output of the last one of the data conversion components of the encryption unit is connected with an input of the data register component of the encryption unit;

a sub-key output of each of the data conversion components of the key expansion unit is connected with a sub-key input of the corresponding one of the data conversion components of the encryption unit;

the data register component of the expansion unit is adapted to register an input external key and data resulting from the last one of the data conversion components of the key expansion unit;

the data conversion component of the key expansion unit is adapted to receive the data registered in the data register component of the key expansion unit to expand the key into sub-keys input to the corresponding data conversion component of the encryption unit;

the data register component of the encryption unit is adapted to register input external data and data resulting from the last one of the data conversion components of the encryption unit; and the data conversion component of the encryption unit is adapted to receive the data registered in the data register component of the encryption unit and to encrypt and convert the received data using the sub-keys resulting from the corresponding data conversion component of the key expansion unit.

The invention has the following advantages.

1. The encryption processing device according to the invention can effectively reduce a consumed resource and hence a cost of the device while maintaining efficiency of the existing technology because a sub-key array storage unit is dispensed with.

2. With the encryption processing device according to the invention, a consumed resource is only 60% of that in the existing technology in the case of one conversion component and 70% of that in the existing technology in the case of two conversion components.

3. Since the sub-key register unit is added, a crucial path can be shortened in an integrated circuit to increase a primary frequency of a clock of and hence the processing capability of the device.

Herein, 1 denotes a key expansion unit, 100 denotes a data register component of the key expansion unit, 101 (101a, 101b) denotes a data conversion component of the key expansion unit, 2 denotes a sub-key array storage unit, 3 denotes an encryption unit, 300 denotes a data register component of the encryption unit, 301 (301a, 301b) denotes a data conversion component of the encryption unit, 4 denotes a sub-key register unit, and 401 (401a, 401b) denotes a sub-key register component.

DETAILED DESCRIPTION OF THE INVENTION

Now a device according to the invention will be detailed below with reference to the drawings.

Figure 1:
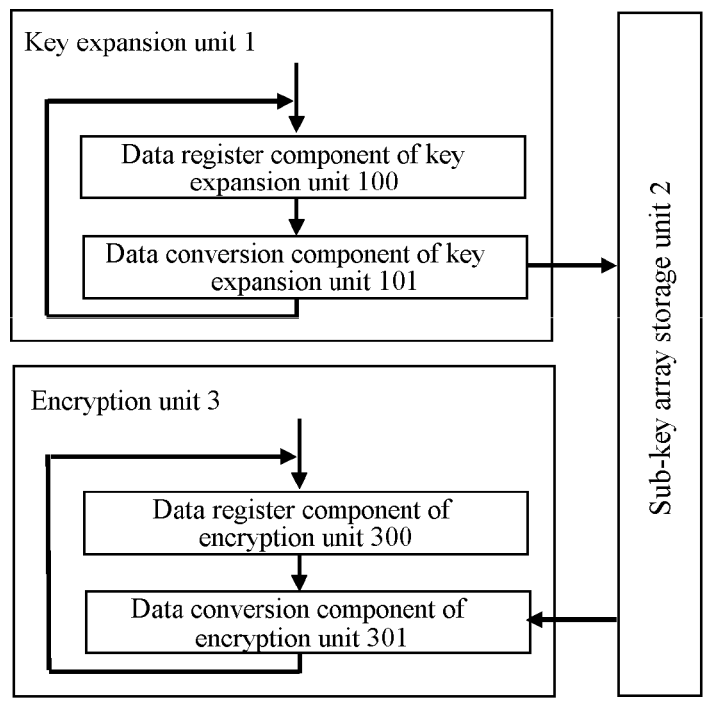
FIG. 1 is a schematic diagram illustrating a first structure of an encryption and decryption processing device in the existing technology.
Figure 2:
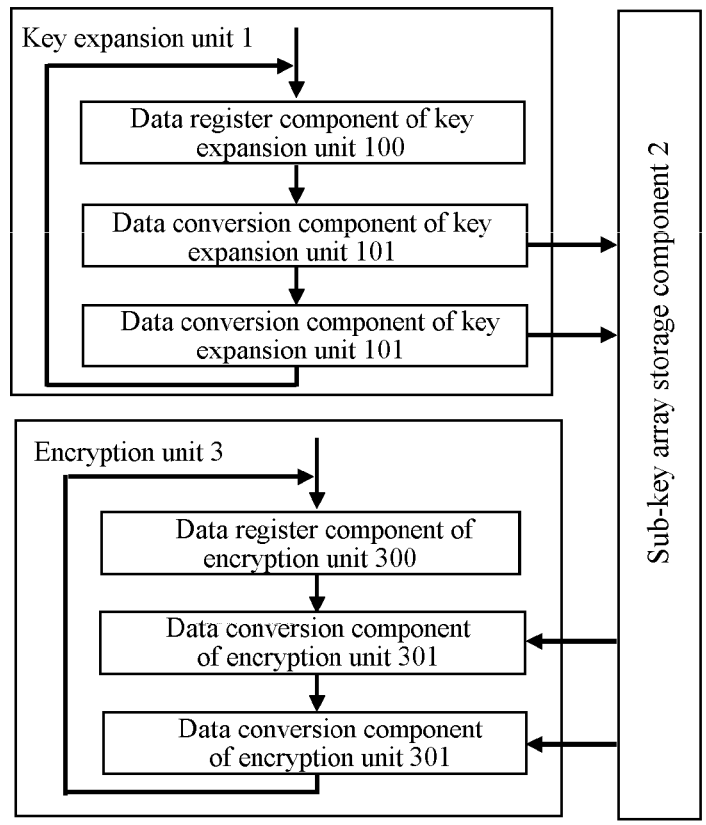
FIG. 2 is a schematic diagram illustrating a second structure of an encryption and decryption processing device in the existing technology.
Figure 3:
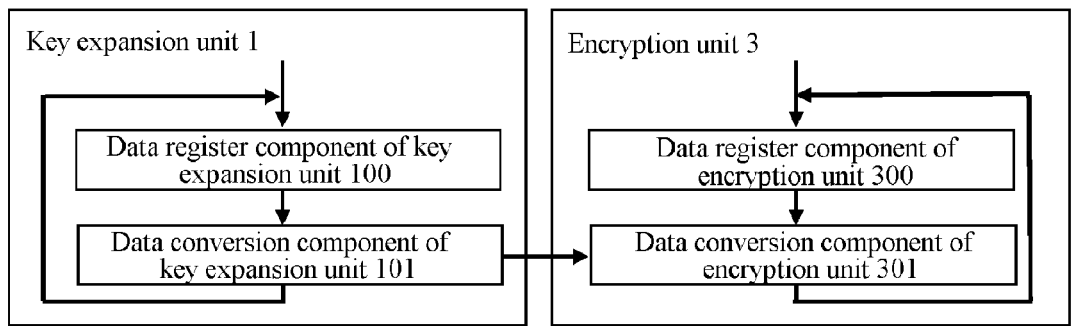
FIG. 3 is a schematic diagram illustrating a first structure of an encryption and decryption processing device according to the invention.

The First Embodiment:

As illustrated in FIG. 3, a first encryption processing device based upon a block cipher algorithm includes a key expansion unit 1 and an encryption unit 3.

The key expansion unit 1 includes a data register component 100 of the key expansion unit and a data conversion component 101 of the key expansion unit, an output of the data register component 100 of the key expansion unit is connected with an input of the data conversion component 101 of the key expansion unit, and an output of the data conversion component 101 of the key expansion unit is connected with an input of the data register component 100 of the key expansion unit.

The encryption unit 3 includes a data register component 300 of the encryption unit and a data conversion component 301 of the encryption unit, an output of the data register component 300 of the encryption unit is connected with an input of the data conversion component 301 of the encryption unit, and an output of the data conversion component 301 of the encryption unit is connected with an input of the data register component 300 of the encryption unit.

Particularly, a sub-key output of the data conversion component 101 of the key expansion unit is connected with a sub-key input of the data conversion component 301 of the encryption unit.

Referring to FIG. 3, the first encryption processing device based upon a block cipher algorithm performs the following steps of a method according to an embodiment of the invention.

1] An external key is registered: a processed external key is input to the data register component 100 of the key expansion unit for registering upon arrival of a clock edge of a clock cycle.

2] External data is registered: a set of external data is input to the data register component 300 of the encryption unit for registering upon arrival of the clock edge of the clock cycle.

3] The key is expanded: in the clock cycle, the data registered in the data register component 100 of the key expansion unit is input to the data conversion component 101 of the key expansion unit to expand the key into sub-keys input to the data conversion component 301 of the encryption unit.

4] The data is encrypted and converted: in the clock cycle, the data registered in the data register component 300 of the encryption unit is input to the data conversion component 301 of the encryption unit, which in turn encrypts and converts the data.

5] The internal data is registered: upon arrival of a clock edge of a next clock cycle, data resulting from the data conversion component 101 of the key expansion unit is input to the data register component 100 of the key expansion unit for registering, and data resulting from the data conversion component 301 of the encryption unit is input to the data register component 300 of the encryption unit for registering.

6] The data is processed iteratively: the step of expanding the key, the step of encrypting and converting the data, and the step of registering the internal data are repeated until the data is converted for a number of times as specified in the block cipher algorithm, and then encryption of the set of data is completed.

Figure 4:
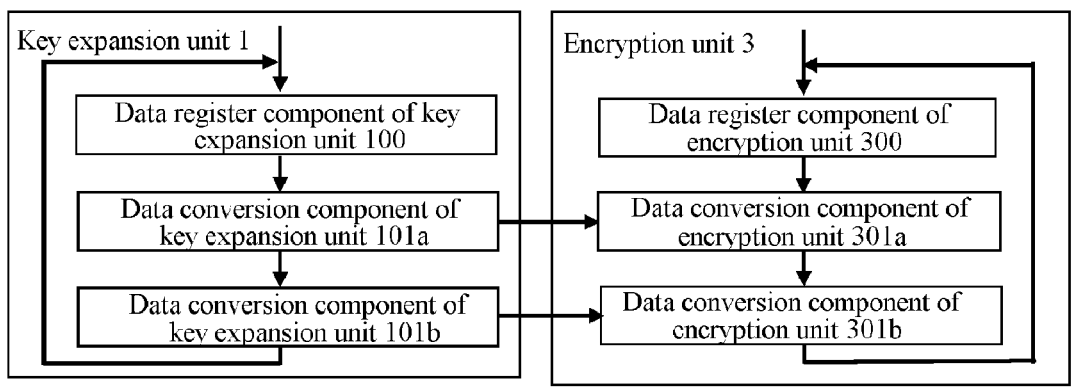
FIG. 4 is a schematic diagram illustrating a second structure of an encryption and decryption processing device according to the invention.

The Second Embodiment:

As illustrated in FIG. 4, a second encryption processing device based upon a block cipher algorithm includes a key expansion unit 1 and an encryption unit 3.

The key expansion unit 1 includes a data register component 100 of the key expansion unit and two data conversion components 101*a* and 101*b* of the key expansion unit, an output of the data register component 100 of the key expansion unit is connected with an input of the first data conversion component 101*a* of the key expansion unit, the two data conversion components 101*a* and 101*b* of the key expansion unit are connected sequentially, and an output of the second data conversion component 101*b* of the key expansion unit is connected with an input of the data register component 100 of the key expansion unit.

The encryption unit 3 includes a data register component 300 of the encryption unit and two data conversion components 301*a* and 301*b* of the encryption unit, an output of the data register component 300 of the encryption unit is connected with an input of the first data conversion component 301*a* of the encryption unit, the two data conversion components 301*a* and 301*b* of the encryption unit are connected sequentially, and an output of the second data conversion component 301*b* of the encryption unit is connected with an input of the data register component 300 of the encryption unit.

Particularly, a sub-key output of the first data conversion component 101*a* of the key expansion unit is connected with a sub-key input of the first data conversion component 301*a* of the encryption unit, and a sub-key output of the second data conversion component 101*b* of the key expansion unit is connected with a sub-key input of the second data conversion component 301*b* of the encryption unit.

Particularly, the number of data conversion components of the key expansion unit is identical to the number of data conversion components of the encryption unit can be three, four and up to thirty-two or forth-eight, preferably one, two or four.

Referring to FIG. 4, the second encryption processing device based upon a block cipher algorithm performs the following steps of a method according to an embodiment of the invention.

1] An external key is registered: a processed external key is input to the data register component 100 of the key expansion unit for registering upon arrival of a clock edge of a clock cycle.

2] External data is registered: a set of external data is input to the data register component 300 of the encryption unit for registering upon arrival of the clock edge of the clock cycle.

3] The key is expanded: in the clock cycle, the data registered in the data register component 100 of the key expansion unit is input to the data conversion component 101*a* of the key expansion unit to expand the key into sub-keys input to the data conversion component 301*a* of the encryption unit, and data output from the data conversion component 101*a* of the key expansion unit is input to the next data conversion component 101*b* of the key expansion unit, so that the data conversion components of the key expansion unit expand the key sequentially.

4] The data is encrypted and converted: in the clock cycle, the data registered in the data register component 300 of the encryption unit is input to the data conversion component 301*a* of the encryption unit, which in turn encrypts and converts the data, and data output from the data conversion component 301*a* of the encryption unit is input to the next data conversion component 301*b* of the encryption unit, so that the data conversion components of the encryption unit encrypt the data sequentially.

5] The internal data is registered: upon arrival of a clock edge of a next clock cycle, data output from the last data conversion component (101*b* in the present embodiment) of the key expansion unit is input to the data register component 100 of the key expansion unit for registering, and data output from the last data conversion component (301*b* in the present embodiment) of the encryption unit is input to the data register component 300 of the encryption unit for registering.

6] The data is processed iteratively: the step of expanding the key, the step of encrypting and converting the data, and the step of registering the internal data are repeated until the data is converted for a number of times as specified in the block cipher algorithm, and then encryption of the set of data is completed.

Figure 5:
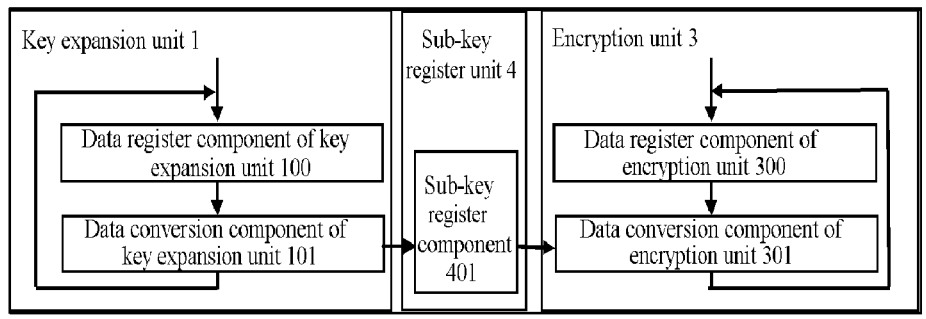
FIG. 5 is a schematic diagram illustrating a third structure of an encryption and decryption processing device according to the invention.

The Third Embodiment:

As illustrated in FIG. 5, a third encryption processing device based upon a block cipher algorithm includes a key expansion unit 1, a sub-key register unit 4 and an encryption unit 3.

The key expansion unit 1 includes a data register component 100 of the key expansion unit and a data conversion component 101 of the key expansion unit, an output of the data register component 100 of the key expansion unit is connected with an input of the data conversion component 101 of the key expansion unit, and an output of the data conversion component 101 of the key expansion unit is connected with an input of the data register component 100 of the key expansion unit.

The sub-key register unit 4 includes a sub-key register component 401 which may be a general flip flop or register.

The encryption unit 3 includes a data register component 300 of the encryption unit and a data conversion component 301 of the encryption unit, an output of the data register component 300 of the encryption unit is connected with an input of the data conversion component 301 of the encryption unit, and an output of the data conversion component 301 of the encryption unit is connected with an input of the data register component 300 of the encryption unit.

Particularly, a sub-key output of the data conversion component 101 of the key expansion unit is connected with an input of the sub-key register component 401, and an output of the sub-key register component 401 is connected with a sub-key input of the data conversion component 301 of the encryption unit.

Referring to FIG. 5, the third encryption processing device based upon a block cipher algorithm performs the following steps of a method according to an embodiment of the invention.

1] An external key is registered: a processed external key is input to the data register component 100 of the key expansion unit for registering upon arrival of a clock edge of a clock cycle.

2] A key is pre-expanded: in a clock cycle in which the external key is registered, data registered in the data register component 100 of the key expansion unit is input to the data conversion component 101 of the key expansion unit to expand the key into sub-keys input to the input of the sub-key register component 401 connected therewith, and data resulting from the data conversion component 101 of the key expansion unit is input to the input of the data register component 100 of the key expansion unit.

3] The key is buffered and registered: upon arrival of a clock edge of a next clock cycle after the step of registering the external key, data resulting from the data conversion component 101 of the key expansion unit is input to the data register component 100 of the key expansion unit for registering, and the sub-keys of the data conversion component 101 of the key expansion unit are input to the sub-key register component 401 for registering.

4] The external data is registered: a set of external data is input to the data register component 300 of the encryption unit for registering upon arrival of the clock edge of the next clock cycle after the step of registering the external key.

5] The key is expanded: in the clock cycle, the data registered in the data register component 100 of the key expansion unit is input to the data conversion component 101 of the key expansion unit to expand the key into sub-keys input to the input of the sub-key register component 401 connected therewith, data output from the data conversion component 101 of the key expansion unit is input to the input of the data register component 100 of the key expansion unit, and the sub-keys output from the sub-key register component 401 are input to the data conversion component 301 of the encryption unit.

6] The data is encrypted and converted: in the clock cycle, the data registered in the data register component 300 of the encryption unit is input to the data conversion component 301 of the encryption unit, which in turn encrypts and converts the data, and data output from the data conversion component 301 of the encryption unit is input to the input of the data register component 300 of the encryption unit.

7] The internal data is registered: upon arrival of a clock edge of a next clock cycle, data resulting from the data conversion component 101 of the key expansion unit is input to the data register component 100 of the key expansion unit for registering, the sub-keys of the data conversion component 101 of the key expansion unit are input to the sub-key register component 401 for registering, and data resulting from the data conversion component 301 of the encryption unit is input to the data register component 300 of the encryption unit for registering.

6] The data is processed iteratively: the step of expanding the key, the step of encrypting and converting the data, and the step of registering the internal data are repeated until the data is converted for a number of times as specified in the block cipher algorithm, and then encryption of the set of data is completed.

Figure 6:
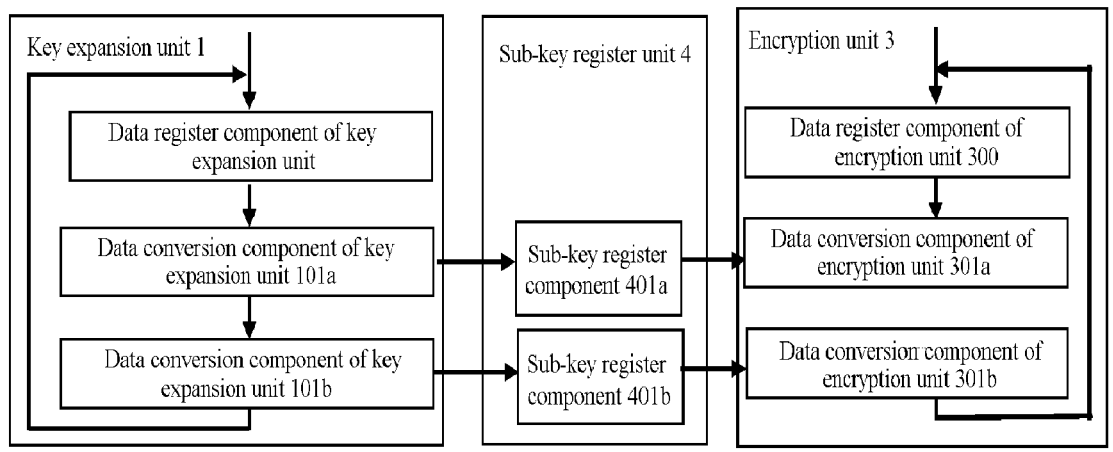
FIG. 6 is a schematic diagram illustrating a fourth structure of an encryption and decryption processing device according to the invention.

The Fourth Embodiment:

As illustrated in FIG. 6, a fourth encryption processing device based upon a block cipher algorithm includes a key expansion unit 1, a sub-key register unit 4 and an encryption unit 3.

The key expansion unit 1 includes a data register component 100 of the key expansion unit and two data conversion components 101a and 101b of the key expansion unit, an output of the data register component 100 of the key expansion unit is connected with an input of the first data conversion component 101a of the key expansion unit, the two data conversion components 101a and 101b of the key expansion unit are connected sequentially, and an output of the second data conversion component 101b of the key expansion unit is connected with an input of the data register component 100 of the key expansion unit.

The sub-key register unit 4 includes two sub-key register components 401a and 401b which may be a general flip flop or register.

The encryption unit 3 includes a data register component 300 of the encryption unit and two data conversion components 301a and 301b of the encryption unit, an output of the data register component 300 of the encryption unit is connected with an input of the first data conversion component 301a of the encryption unit, the two data conversion components 301a and 301b of the encryption unit are connected sequentially, and an output of the second data conversion component 301b of the encryption unit is connected with an input of the data register component 300 of the encryption unit.

Particularly, a sub-key output of the first data conversion component 101a of the key expansion unit is connected with an input of the first sub-key register component 401a, and an output of the first sub-key register component 401a is connected with a sub-key input of the first data conversion component 301a of the encryption unit; and a sub-key output of the second data conversion component 101b of the key expansion unit is connected with an input of the second sub-key register component 401b, and an output of the second sub-key register component 401b is connected with a sub-key input of the second data conversion component 301b of the encryption unit.

Particularly, the number of data conversion components of the key expansion unit, the number of sub-key register components and the number of data conversion components of the encryption unit are identical and can be three, four and up to thirty-two or forth-eight, preferably one, two or four.

Referring to FIG. 6, the fourth encryption processing device based upon a block cipher algorithm performs the following steps of a method according to an embodiment of the invention.

1] An external key is registered: a processed external key is input to the data register component 100 of the key expansion unit for registering upon arrival of a clock edge of a clock cycle.

2] A key is pre-expanded: in a clock cycle in which the external key is registered, data registered in the data register component 100 of the key expansion unit is input to the first data conversion component 101a of the key expansion unit to expand the key into sub-keys input to the input of the first sub-key register component 401a connected therewith, and data output from the first data conversion component 101a of the key expansion unit is input to the input of the next data register component 101b of the key expansion unit to expand the key for the second time, so that the data conversion components of the key expansion unit expand the key sequentially into sub-keys input to the inputs of the respective sub-key register components connected therewith, and data output from the last data conversion component (101b in the present embodiment) of the key expansion unit is input to the input of the data register component 100 of the key expansion unit.

3] The key is buffered and registered: upon arrival of a clock edge of a next clock cycle after the step of registering the external key, data resulting from the last data conversion component (101b in the present embodiment) of the key expansion unit is input to the data register component 100 of the key expansion unit for registering, and the sub-keys of the data conversion components of the key expansion unit are input to the sub-key register components corresponding thereto for registering.

4] The external data is registered: a set of external data is input to the data register component 300 of the encryption unit for registering upon arrival of the clock edge of the next clock cycle after the step of registering the external key.

5] The key is expanded: in the clock cycle, the data registered in the data register component 100 of the key expansion unit is input to the first data conversion component 101*a* of the key expansion unit to expand the key into sub-keys input to the input of the first sub-key register component 401*a* connected therewith, and data output from the first data conversion component 101*a* of the key expansion unit is input to the input of the next data register component 101*b* of the key expansion unit to expand the key for the second time, so that the data conversion components of the key expansion unit expand the key sequentially into sub-keys input to the inputs of the respective sub-key register components connected therewith, and data output from the last data conversion component (101*b* in the present embodiment) of the key expansion unit is input to the data input of the data register component 100 of the key expansion unit.

6] The data is encrypted and converted: in the clock cycle, the data registered in the data register component 300 of the encryption unit is input to the first data conversion component 301*a* of the encryption unit, and the sub-keys of the first sub-key register component 401*a* are input to the first data conversion component 301*a* of the encryption unit, which in turn encrypts and converts the data; and the encrypted and converted data from the first data conversion component 301*a* of the encryption unit is input to the second data conversion component 301*b* of the encryption unit, and the sub-keys of the second sub-key register component 401*b* are input to the second data conversion component 301*b* of the encryption unit, which in turn encrypts and converts the data, so that the data conversion components of the encryption unit corresponding to the data conversion components of the key expansion unit encrypt and convert the data sequentially, and data output from the last data conversion component (301*b* in the present embodiment) of the encryption unit is input to the data input of the data register component 300 of the encryption unit.

7] The internal data is registered: upon arrival of a clock edge of a next clock cycle, data resulting from the last data conversion component (101*b* in the present embodiment) of the key expansion unit is input to the data register component 100 of the key expansion unit for registering, the sub-keys of the data conversion components of the key expansion unit are input to the sub-key register components corresponding thereto for registering, and data resulting from the last data conversion component (301*b* in the present embodiment) of the encryption unit is input to the data register component 300 of the encryption unit for registering.

8] The data is processed iteratively: the step of expanding the key, the step of encrypting and converting the data, and the step of registering the internal data are repeated until the data is converted for a number of times as specified in the block cipher algorithm, and then encryption of the set of data is completed.

If the encryption processing device is provided with a plurality of data conversion components of the key expansion unit, a plurality of sub-key register components, and a plurality of data conversion components of the encryption unit, then they expand the key and encrypt the data sequentially in the sequence in which they are connected.

If the SMS4 algorithm is particularly adopted as the block cipher algorithm, then the encryption method in the foregoing four embodiments converts the data iteratively particularly for thirty-two times.

What is claimed is:

1. An encryption processing device based upon a block cipher algorithm, comprising a key expansion unit and an encryption unit, wherein:

the key expansion unit comprises a data register component of the key expansion unit and at least one data conversion component of the key expansion unit, the encryption unit comprises a data register component of the encryption unit and at least one data conversion component of the encryption unit, the number of data conversion components of the encryption unit is identical to the number of data conversion components of the key expansion unit, and the data conversion components of the encryption unit are in one-to-one connection with the data conversion components of the key expansion unit;

an output of the data register component of the key expansion unit is connected with an input of the first one of the data conversion components of the key expansion unit, every two adjacent ones of the data conversion components of the key expansion unit are connected sequentially, and an output of the last one of the data conversion components of the key expansion unit is connected with an input of the data register component of the key expansion unit;

an output of the data register component of the encryption unit is connected with an input of the first one of the data conversion components of the encryption unit, every two adjacent ones of the data conversion components of the encryption unit are connected sequentially, and an output of the last one of the data conversion components of the encryption unit is connected with an input of the data register component of the encryption unit;

a sub-key output of each of the data conversion components of the key expansion unit is connected with a sub-key input of the corresponding one of the data conversion components of the encryption unit;

the data register component of the expansion unit is adapted to register an input external key and data resulting from the last one of the data conversion components of the key expansion unit;

the data conversion component of the key expansion unit is adapted to receive the data registered in the data register component of the key expansion unit to expand the key into sub-keys input to the corresponding data conversion component of the encryption unit;

the data register component of the encryption unit is adapted to register input external data and data resulting from the last one of the data conversion components of the encryption unit; and the data conversion component of the encryption unit is adapted to receive the data registered in the data register component of the encryption unit and to encrypt and convert the received data using the sub-keys resulting from the corresponding data conversion component of the key expansion unit.

2. The encryption processing device based upon a block cipher algorithm according to claim 1, wherein the number of data conversion components of the key expansion unit ranges from one to thirty-two, and then the number of data conversion components of the encryption unit ranges from one to thirty-two correspondingly.

3. The encryption processing device based upon a block cipher algorithm according to claim 2, wherein the number of data conversion components of the key expansion unit is one, two or four, and then the number of data conversion components of the encryption unit is one, two or four correspondingly.

4. The encryption processing device based upon a block cipher algorithm according to claim 1, wherein:
- the encryption processing device further comprises a sub-key register unit comprising at least one sub-key register component, the number of which is identical to the number of data conversion components of the key expansion unit, and the sub-key register components are in one-to-one connection with the data conversion components of the key expansion unit;
- the output of each of the data conversion components of the key expansion unit is connected with an input of the corresponding one of the sub-key register components, and an output of each of the sub-key register components is connected with the input of the corresponding one of the data conversion components of the encryption unit;
- the data conversion component of the key expansion unit is adapted to receive the data registered in the data register component of the key expansion unit to expand the key into sub-keys input to the input of the sub-key register component;
- the sub-key register component is adapted to register the sub-keys resulting from the data conversion component of the key expansion unit; and
- the data conversion component of the encryption unit is adapted to receive the sub-keys registered in the sub-key register component and to encrypt and convert the received data using the sub-keys.

5. The encryption processing device based upon a block cipher algorithm according to claim 4, wherein the number of data conversion components of the key expansion unit ranges from one to thirty-two, and then the number of sub-key register components ranges from one to thirty-two correspondingly, and the number of data conversion components of the encryption unit ranges from one to thirty-two correspondingly.

6. The encryption processing device based upon a block cipher algorithm according to claim 5, wherein the number of data conversion components of the key expansion unit is one, two or four, and then the number of sub-key register components ranges from one, two or four correspondingly, and the number of data conversion components of the encryption unit is one, two or four correspondingly.

7. The encryption processing device based upon a block cipher algorithm according to claim 4, wherein the sub-key register component is a general flip flop or register.

8. The encryption processing device based upon a block cipher algorithm according to claim 5, wherein the sub-key register component is a general flip flop or register.

9. The encryption processing device based upon a block cipher algorithm according to claim 6, wherein the sub-key register component is a general flip flop or register.

* * * * *